United States Patent [19]
Ohira et al.

[11] Patent Number: 5,867,338
[45] Date of Patent: Feb. 2, 1999

[54] DISC DRIVE APPARATUS

[75] Inventors: Tsunehisa Ohira, Sagamihara; Masaki Hagiwara, Fujisawa, both of Japan

[73] Assignee: Victor Company of Japan, Ltd., Yokohama, Japan

[21] Appl. No.: 762,150

[22] Filed: Dec. 9, 1996

[30] Foreign Application Priority Data

Dec. 11, 1995 [JP] Japan ................................. 7-322013

[51] Int. Cl.⁶ ................................................. G11B 33/02
[52] U.S. Cl. ..................... 369/75.2; 369/77.1; 369/77.2
[58] Field of Search .............................. 369/75.2, 77.1, 369/77.2, 14, 15

[56] References Cited

U.S. PATENT DOCUMENTS

| | | | |
|---|---|---|---|
| 5,299,185 | 3/1994 | Sakurai et al. | 369/75.2 |
| 5,301,176 | 4/1994 | Kawachi et al. | 369/75.2 |
| 5,539,717 | 7/1996 | Choi | 369/75.2 |
| 5,572,498 | 11/1996 | Choi | 369/77.2 |
| 5,583,839 | 12/1996 | Choi | 369/75.2 |
| 5,586,104 | 12/1996 | Choi | 369/264 |
| 5,590,113 | 12/1996 | Choi | 369/270 |
| 5,615,197 | 3/1997 | Choi | 369/77.2 |

FOREIGN PATENT DOCUMENTS

| | | |
|---|---|---|
| 0 645 768 A2 | 3/1995 | European Pat. Off. . |
| 3216856 | 9/1991 | Japan . |
| 5012776 | 1/1993 | Japan . |
| 6-180917 | 6/1994 | Japan . |
| 7161112 | 6/1995 | Japan . |
| 7-334903 | 12/1995 | Japan . |
| 8-7429 | 1/1996 | Japan . |
| 8-7466 | 1/1996 | Japan . |

Primary Examiner—William J. Klimowicz
Attorney, Agent, or Firm—Pollock, Vande Sande & Amernick

[57] ABSTRACT

A disc drive apparatus includes a main chassis. A turntable is provided on the main chassis for rotating a disc. A head is operative for accessing a disc rotated by the turntable. A disc loading mechanism includes a tray for loading a bare disc or a combination of a disc and a cartridge onto the turntable. The tray is allowed to move among first, second, and third predetermined positions. The first predetermined position is designed for placing a bare disc on the tray. The second predetermined position is designed for placing a combination of a disc and a cartridge on the tray. The third predetermined position is designed for holding a bare disc or a disc in a cartridge on the turntable.

14 Claims, 7 Drawing Sheets

DISC DRIVE APPARATUS

BACKGROUND OF THE INVENTION

1. Field of the Invention

This invention relates to a disc drive apparatus such as an information-storage disc drive apparatus.

2. Description of the Prior Art

Some optical discs for storing information are bare or uncovered. Examples of such bare discs are CD's (compact discs) and CD-ROM's (compact disc read only memories). Also, there are optical discs covered by cartridges or cassettes.

Japanese published unexamined patent application 7-161112 discloses a disc drive apparatus which can handle both a bare disc and a cartridge-covered disc. The apparatus of Japanese application 7-161112 includes a disc loading mechanism having a common tray on which either a bare disc or a cartridge-covered disc can be placed. The common tray can move into and out of an apparatus casing. When the common tray is in an outermost position relative to the apparatus casing, a bare disc or a cartridge-covered disc is placed thereon. Then, the common tray with the disc is moved into the apparatus casing, and the disc is placed in position within the apparatus casing. Subsequently, the disc is driven so that information can be reproduced therefrom or written thereon.

In the apparatus of Japanese application 7-161112, a step of moving the common tray to its outermost position is required before a cartridge-covered disc is placed in position within the apparatus casing. Also, a similar step is required before a bare disc is placed in position within the apparatus casing.

SUMMARY OF THE INVENTION

It is an object of this invention to provide an improved disc drive apparatus.

A first aspect of this invention provides a disc drive apparatus comprising a main chassis; a turntable provided on the main chassis for rotating a disc; a head for accessing a disc rotated by the turntable; a disc loading mechanism including a tray for loading a bare disc or a combination of a disc and a cartridge onto the turntable; and means for allowing the tray to move among first, second, and third predetermined positions, the first predetermined position being designed for placing a bare disc on the tray, the second predetermined position being designed for placing a combination of a disc and a cartridge on the tray, the third predetermined position being designed for holding a bare disc or a disc in a cartridge on the turntable.

A second aspect of this invention is based on the first aspect thereof, and provides a disc drive apparatus further comprising means for guiding the tray while the tray moves among the first, second, and third predetermined positions.

A third aspect of this invention is based on the first aspect thereof, and provides a disc drive apparatus further comprising a casing which supports the main chassis, the first predetermined position being in front of the main chassis so that a bare disc on the tray can be handled from above.

A fourth aspect of this invention is based on the third aspect thereof, and provides a disc drive apparatus wherein the disc loading mechanism comprises an opening in a front of the casing, and the tray with a bare disc is allowed to move to and from the first predetermined position through the opening in the front of the casing.

A fifth aspect of this invention is based on the first aspect thereof, and provides a disc drive apparatus further comprising a casing which supports the main chassis, the second predetermined position being above the main chassis and being designed so that a combination of a disc and a cartridge on the tray can be handled via a front of the casing.

A sixth aspect of this invention is based on the fifth aspect thereof, and provides a disc drive apparatus wherein a front of the casing has an opening via which a combination of a disc and a cartridge can be inserted into the casing and be placed on the tray in the second predetermined position.

A seventh aspect of this invention is based on the fourth aspect thereof, and provides a disc drive apparatus wherein a combination of a disc and a cartridge can be inserted into the casing and be placed on the tray in the second predetermined position via the opening in the front of the casing.

An eighth aspect of this invention provides a disc drive apparatus comprising a casing which has an opening; a movable tray; first means for moving the tray relative to the casing between first and second predetermined positions, the tray extending outward from the casing when assuming the first predetermined position, the tray in the first predetermined position accepting a bare disc, the tray being in the casing when assuming the second predetermined position, the tray passing through the opening in the casing when moving between the first and second predetermined positions; second means for allowing a combination of a disc and a cartridge to be manually inserted into the casing and to be manually placed on the tray via the opening in the casing when the tray is in the second predetermined position; and third means for accessing either a disc in a cartridge or a bare disc on the tray in the casing.

A ninth aspect of this invention is based on the eighth aspect thereof, and provides a disc drive apparatus wherein the second means comprises an opening in an edge of the tray, and a recess in the tray, the opening in the tray communicating with the recess therein, the opening in the tray being located near and exposed via the opening in the casing when the tray is in the second predetermined position, the recess conforming in shape to a combination of a disc and a cartridge, the opening in the tray allowing a combination of a disc and a cartridge to be manually placed into the recess in the tray when the tray is in the second predetermined position.

DESCRIPTION OF THE PREFERRED EMBODIMENT

Figure 1:
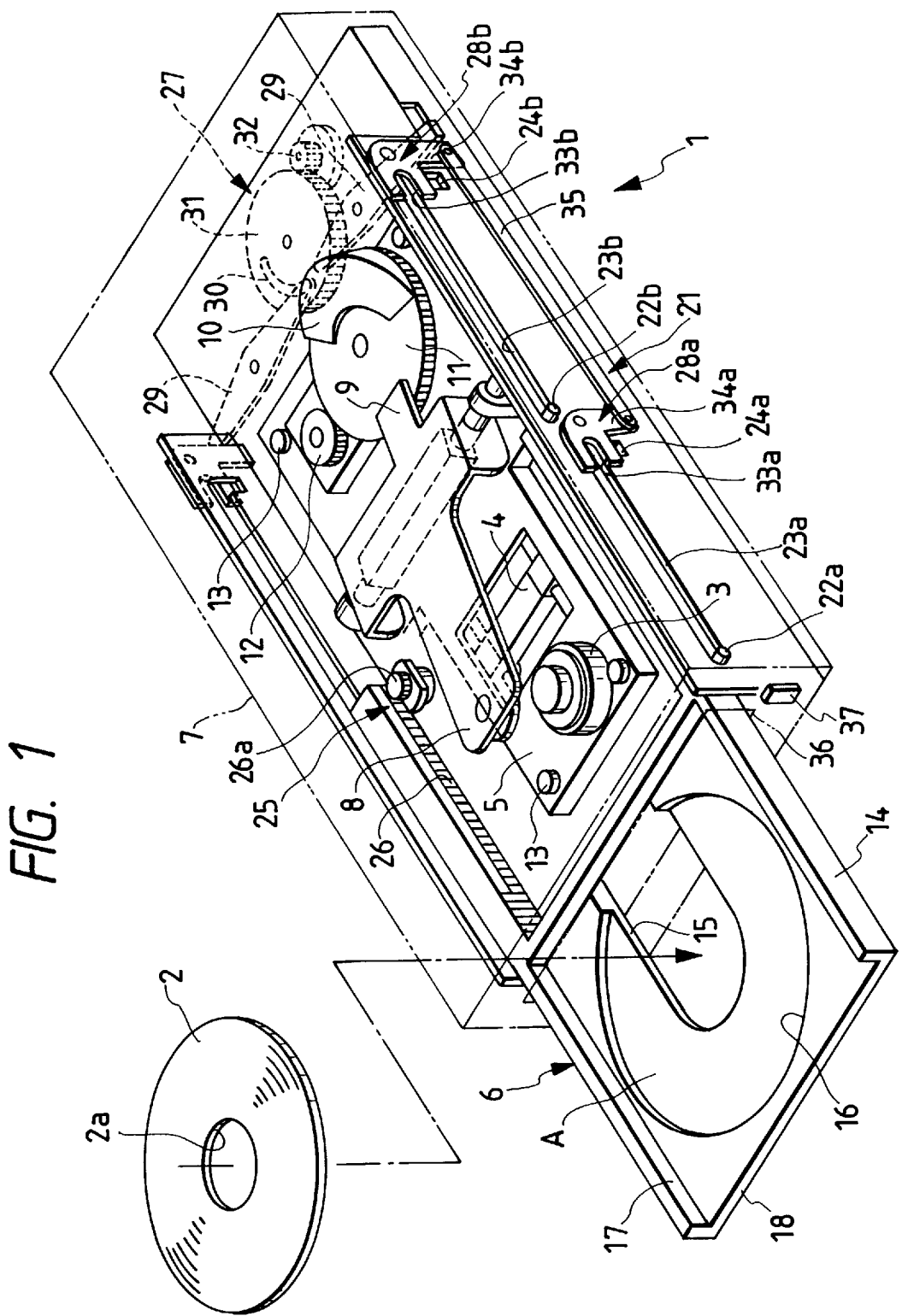
FIG. 1 is a perspective view of an interior of a disc drive apparatus according to an embodiment of this invention.

With reference to FIG. 1, a disc drive apparatus 1 is designed to handle a disc 2 having a central hole 2a of a circular shape. The disc 2 forms an information recording medium. In FIG. 1, the disc 2 is bare. The disc 2 may be covered by a cartridge. The disc drive apparatus 1 includes a turntable 3, a head 4, a main chassis 5, a disc loading mechanism 6, and a casing 7.

The turntable 3 serves to rotate the disc 2 while holding an inner part of the disc 2 around the central hole 2a. The turntable 3 is provided with a motor for generating a force for rotating the disc 2. The head 4 serves to access the disc 2 which is located on the turntable 3. Information can be reproduced from or written on the disc 2 via the head 4. The turntable 3 and the head 4 are supported on the main chassis 5. The main chassis 5 is fixed to the casing 7 via support members 13. It is preferable that the support members 13 include vibration insulators. The disc loading mechanism 6 serves to place the disc 2 in position with respect to the main chassis 5 regardless of whether the disc 2 is bare or covered by a cartridge. The turntable 3, the head 4, and the main chassis 5 are accommodated in the casing 7. The disc loading mechanism 6 is accommodated in the casing 7 when being in a retracted position. The disc loading mechanism 6 is supported by the casing 7.

The main chassis 5 is provided with a clamp 8 for holding the disc 2 on the turntable 3. A major part of the clamp 8 extends above the turntable 3. The clamp 8 can rotate or swing about a shaft (no reference numeral) in a limited angular range. The clamp 8 has an arm 9 distant from the major part thereof. A spring (not shown) urges the clamp 8 so that the arm 9 can engage a cam 10 formed on a gear 11. Thus, the arm 9 can be operated by the cam 10. The gear 11 is provided on the main chassis 5. The gear 11 meshes with a gear 12 provided on the main chassis 5. The gear 12 can be driven by a motor. As the gear 12 is driven by the motor, the gear 11 and the cam 10 rotate. The arm 9 is moved in accordance with rotation of the cam 10. The major part of the clamp 8 moves toward and away from the turntable 3 as the arm 9 is moved by the cam 10.

The disc loading mechanism 6 includes a tray 14 which can move into and out of the casing 7, that is, which can move back and forth relative to the casing 7. Specifically, the tray 14 can move among an outer position and inner positions relative to the casing 7.

The outer position agrees with a first predetermined position "A" in front of the casing 7. When the tray 14 assumes the first predetermined position (the outer position) "A", a bare disc 2 can be placed thereon. As will be made clear later, the inner positions agree with second and third predetermined positions "B" and "C" within the casing 7. The third predetermined position "C" corresponds to a set position (a normal position) with respect to the main chassis 5. The second predetermined position "B" is intermediate between the first predetermined position "A" and the third predetermined position "C". Thus, the tray 14 passes through the second predetermined position "B" as the tray 14 moves between the first and third predetermined positions "A" and "C".

The disc loading mechanism 6 includes a sensor (not shown) for detecting the position of the tray 14. The output signal of the position sensor is used in controlling the position of the tray 14 in connection with movement of the tray 14. In addition, the disc loading mechanism 6 includes a sensor (not shown) for detecting whether or not a disc is placed on the tray 14. Furthermore, the disc loading mechanism 6 includes a sensor (not shown) for detecting whether or not a cartridge is inserted onto the tray 14. Also, the disc loading mechanism 6 includes a device (not shown) for opening and closing a shutter of a cartridge accommodating a disc.

The tray 14 has an opening 15, a circular recess 16, and a rectangular recess 17. The circular recess 16 conforms in shape to a bare disc. When a bare disc is placed in position on the tray 14, the bare disc is fitted into the circular recess 16. The circular recess 16 extends in a part of the bottom of the rectangular recess 17. The rectangular recess 17 conforms in shape to a cartridge accommodating a disc. When a cartridge with a disc is placed in position on the tray 14, the cartridge is fitted into the rectangular recess 17. The opening 15 communicates with both the circular recess 16 and the rectangular recess 17. When a bare disc or a cartridge-covered disc is placed in its normal position within the casing 7, the opening 15 allows the head 4 to access the disc. The tray 14 has a front end 18 formed with an opening via which the rectangular recess 17 communicates with an exterior. The casing 7 has a front opening 36. When the tray 14 is in the second predetermined position "B" within the casing 7, the opening of the front end 18 of the tray 14 is located near and exposed via the front opening of the casing 7. When the tray 14 is in the second predetermined position "B" within the casing 7, a cartridge with a disc can be manually inserted into the rectangular recess 17 in the tray 14 via the front opening 36 of the casing 7 and the opening in the front end 18 of the tray 14.

A major part of the tray 14 extends in front of the casing 7 when being in the first predetermined position "A". A bare disc 2 can be placed into the circular recess 16 in the tray 14 from above when the tray 14 is in the first predetermined position "A". Also, a bare disc 2 can be taken out from the circular recess 16 in the tray 14 when the tray 14 is in the first predetermined position "A". Accordingly, a bare disc 2 on the tray 14 can be replaced by another when the tray 14 is in the first predetermined position "A".

The tray 14 is connected with a guide mechanism 21. The tray 14 is guided by the guide mechanism 21 when moving between the first predetermined position "A" and the third predetermined position "C". The tray 14 has a pair of rearwardly-extending arms. Each of the rear arms of the tray 14 has a pair of front and rear guide pins 22a and 22b projecting laterally and outwardly. Each of two sides of the casing 7 has a pair of front and rear guide grooves into which the front and rear guide pins 22a and 22b on the tray 14 extend respectively. The guide mechanism 21 includes the front and rear guide pins 22a and 22b and the front and rear guide grooves. The front and rear guide grooves have horizontally-extending portions 23a and 23b and vertically-extending portions 24a and 24b. Rear ends of the horizontally-extending portions 23a and 23b meet upper ends of the vertically-extending portions 24a and 24b respectively. Accordingly, each of the front and rear guide grooves has a bent configuration. During movement of the tray 14, the front and rear guide pins 22a and 22b slide relative to the casing 7 along the front and rear guide grooves respectively.

The guide mechanism 21 or the tray 14 is connected with a back-and-forth drive mechanism 25. The back-and-forth drive mechanism 25 serves to horizontally move the tray 14 into and out of the casing 7, that is, to move the tray 14 back and forth relative to the casing 7. During horizontal movement of the tray 14 by the back-and-forth drive mechanism 25, the front and rear guide pins 22a and 22b slide relative to the casing 7 along the horizontally-extending portions 23a and 23b of the front and rear guide grooves. Specifically, the back-and-forth drive mechanism 25 serves to move the tray 14 between the first and second predetermined positions "A" and "B". The back-and-forth drive mechanism 25 includes a rack 26 and a gear 26a which mesh with each other. The rack 26 is formed on one of the rear arms of the tray 14 along a horizontal direction. The gear 26a is driven by a motor. As the gear 26a rotates, the rack 26 moves horizontally. The tray 14 moves together with the rack 26.

The guide mechanism 21 or the tray 14 is connected with an elevator drive mechanism 27. The elevator drive mechanism 27 includes front and rear catcher links 28a and 28b, seesaw links 29, a cam groove 30, a gear 31, and a gear 32. The front and rear catcher links 28a and 28b catch the front and rear guide pins 22a and 22b respectively when the front and rear guide pins 22a and 22b move backward to the rear ends of the horizontally-extending portions 23a and 23b of the front and rear guide grooves. The front and rear catcher links 28a and 28b can swing or rotate about shafts respectively. The seesaw links 29 engage the rear catcher links 28b. The seesaw links 29 can swing or rotate about shafts respectively. The seesaw links 29 have projections extending into the cam groove 30. The cam groove 30 is formed in the gear 31. The seesaw links 29 swing as the gear 31 rotates. The gear 31 meshes with the gear 32. The gear 32 is driven by a motor.

The front and rear catcher links 28a and 28b have catcher portions 33a and 33b, and arms 34a and 34b extending downward from the catcher portions 33a and 33b, respectively. The catcher portions 33a and 33b have grooves which can move into and out of alignment with the rear ends of the horizontally-extending portions 23a and 23b of the front and rear guide grooves, respectively. When the front and rear guide pins 22a and 22b move backward to the rear ends of the horizontally-extending portions 23a and 23b of the front and rear guide grooves, the front and rear guide pins 22a and 22b enter the grooves in the catcher portions 33a and 33b of the font and rear catcher links 28a and 28b. Thus, the front and rear catcher links 28a and 28b catch the front and rear guide pins 22a and 22b respectively. At this time, the tray 14 is in the second predetermined position "B". During shift of the tray 14 from the second predetermined position "B" to the third predetermined position "C", the front and rear catcher links 28a and 28b direct the front and rear guide pins 22a and 22b to the vertically-extending portions 24a and 24b of the front and rear guide grooves as they rotate. Then, the front and rear catcher links 28a and 28b lower the front and rear guide pins 22a and 22b along the vertically-extending portions 24a and 24b of the front and rear guide grooves as they rotate. The front and rear catcher links 28a and 28b are connected to each other by connection links 35. Accordingly, the front and rear catcher links 28a and 28b rotate together. The connection links 35 are provided with springs (not shown) which serve to urge the front and rear guide pins 22a and 22b downward.

As the gear 32 rotates, the gear 31 and the cam groove 30 rotate. The seesaw links 29 rotate in accordance with rotation of the cam groove 30. As the seesaw links 29 rotate, the front and rear catcher links 28a and 28b rotate. In the case where the front and rear guide pins 22a and 22b are caught by the front and rear catcher links 28a and 28b, the front and rear guide pins 22a and 22b move along the vertically-extending portions 24a and 24b of the front and rear guide grooves in accordance with rotation of the front and rear catcher links 28a and 28b.

As previously explained, a front of the casing 7 has an opening (a front opening) 36 through which the tray 14 with a bare disc 2 can move back and forth relative to the casing 7. The front of the casing 7 has an ejection button 37 located on a side of the opening 36. The ejection button 37 is connected via a controller (not shown) to the back-and-forth drive mechanism 25. In the case where the tray 14 with a bare disc 2 is in the second predetermined position "B" within the casing 7, when the ejection button 37 is actuated, the controller starts the back-and-forth drive mechanism 25. Then, the back-and-forth drive mechanism 25 moves forth the tray 14 to the first predetermined position "A". When the tray 14 in the first predetermined position "A" is temporarily pushed toward the casing 7, the back-and-forth drive mechanism 25 starts to operate and then moves back the tray 14 into the casing 7.

Figure 2:
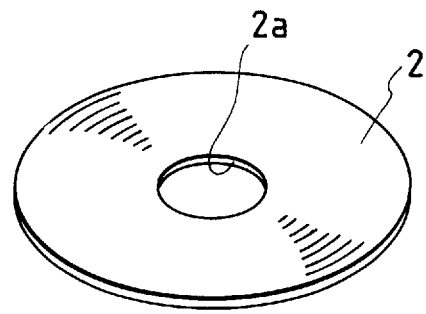
FIG. 2 is a perspective view of a bare disc which can be handled by the disc drive apparatus in FIG. 1.

As shown in FIG. 2, a bare disc 2 has a central hole 2a of a circular shape. Thus, the bare disc 2 is in the form of a doughnut. A lower side of the bare disc 2 has an information recording portion.

Figure 3:
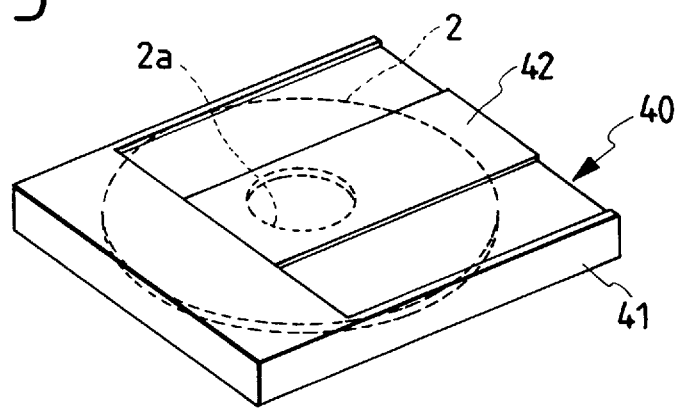
FIG. 3 is a perspective view of a combination of a disc and a cartridge, with a shutter being closed, which can be handled by the disc drive apparatus in FIG. 1.
Figure 4:
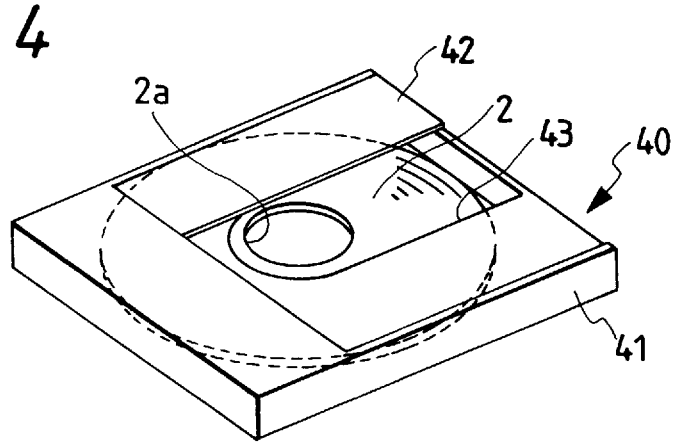
FIG. 4 is a perspective view, corresponding to FIG. 3, of the combination of the disc and the cartridge with the shutter being open.

FIGS. 3 and 4 show a cartridge-covered disc. In FIGS. 3 and 4, a disc 2 having a central circular hole 2a is contained in a cartridge or a casing 41. In FIGS. 3 and 4, the combination of the disc 2 and the cartridge 41 is denoted by the reference numeral "40". The cartridge 41 is provided with a slidable shutter 42 having an upper wall and a lower wall. An upper wall and a lower wall of the cartridge 41 have upper and lower openings 43 respectively. The upper and lower openings 43 align with each other. When the shutter 42 assumes a normal position, the upper and lower openings 43 in the cartridge 41 are fully blocked by the upper and lower walls of the shutter 42 respectively. The upper and lower openings 43 are unblocked as the shutter 42 slides from its normal position (its closed position). When the upper and lower openings 43 are fully unblocked, a part of the disc 2 which includes the central hole 2a is exposed via the openings 43. Generally, the disc 2 in FIGS. 3 and 4 may be similar to the disc 2 in FIG. 2 except for the cartridge 41.

Figure 5:
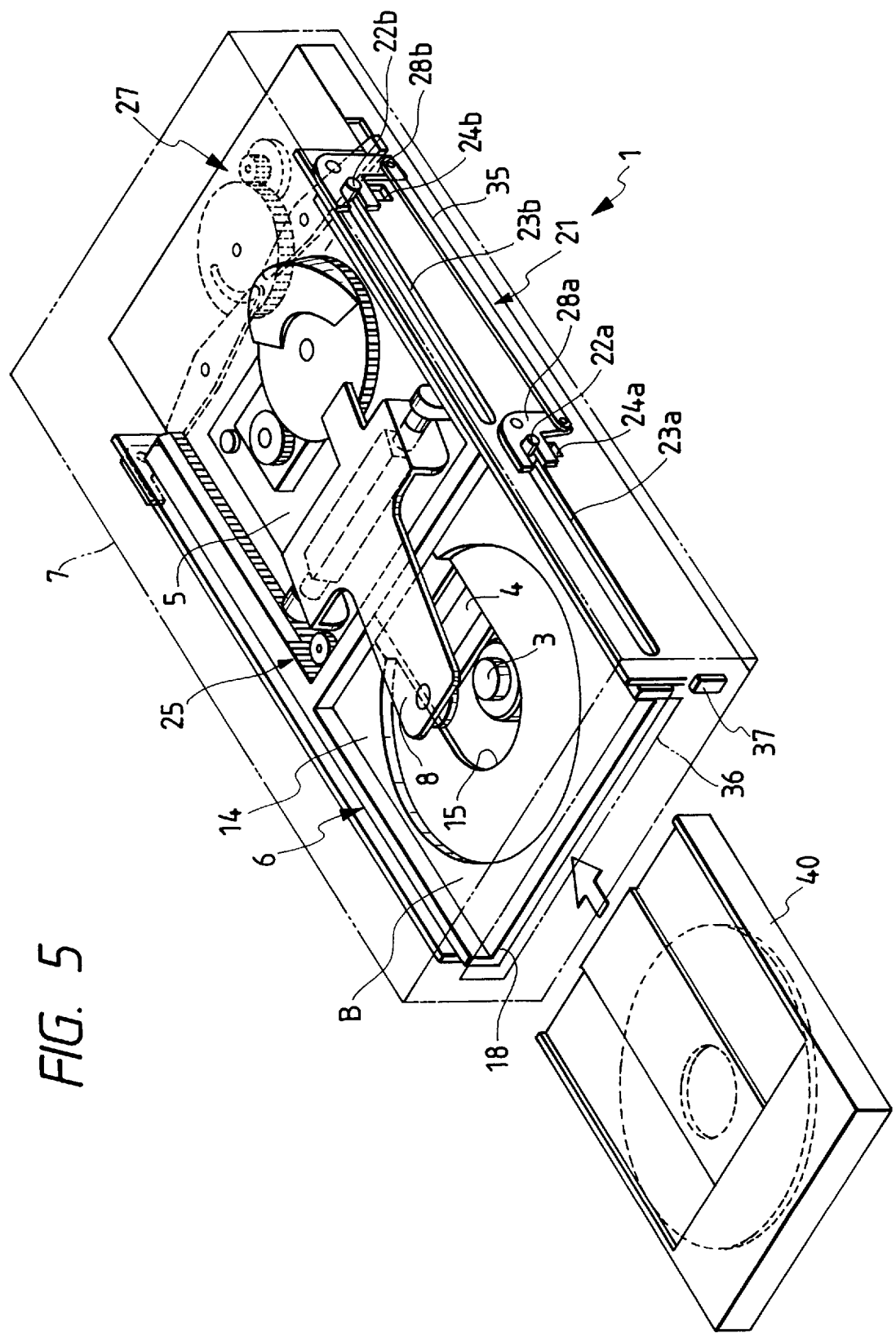
FIG. 5 is a perspective view of the interior of the disc drive apparatus in FIG. 1.

As shown in FIG. 5, the tray 14 can assume the second predetermined position "B" intermediate between the first predetermined position "A" and the third predetermined position "C". When the tray 14 moves back from the first predetermined position "A" to the second predetermined position "B", the front and rear guide pins 22a and 22b reach the rear ends of the horizontally-extending portions 23a and 23b of the front and rear guide grooves. The tray 14 is located within the casing 7 when assuming the second predetermined position "B". Specifically, the tray 14 is located above the main chassis 5 when assuming the second predetermined position "B". A disc-cartridge combination 40 can be inserted into the casing 7 and be placed on the tray 14 when the tray 14 is in the predetermined position "B". Also, a disc-cartridge combination 40 can be taken out from the tray 14 and be ejected from the casing 7 when the tray 14 is in the second predetermined position "B". Accordingly, a disc-cartridge combination 40 on the tray 14 can be replaced by another when the tray 14 is in the second predetermined position "B".

A more detailed description will follow. In the case where the tray 14 is in the second predetermined position "B", the front end 18 of the tray 14 is located near and exposed via the front opening 36 of the casing 7. In this case, a disc-cartridge combination 40 can be manually inserted into the casing 7 and be manually placed into the rectangular recess 17 in the tray 14 via the front opening 36 of the casing 7 and the opening in the front end 18 of the tray 14. Also, a disc-cartridge combination 40 can be taken out from the rectangular recess 17 in the tray 14 and be ejected from the casing 7 via the opening in the front end 18 of the tray 14 and the front opening 36 of the casing 7. Accordingly, a disc-cartridge combination 40 on the tray 14 can be replaced by another when the tray 14 is in the second predetermined position "B". The position of the tray 14 is controlled by a controller (not shown). The second predetermined position "B" agrees with a stand-by position. The guide mechanism 21 serves to guide the tray 14 between the first predetermined position "A" and the third predetermined position "C" via the second predetermined position "B". As previously indicated, the third predetermined position "C" corresponds to a set position (a normal position) with respect to the main chassis 5.

In the case where a disc-cartridge combination 40 is inserted into the casing 7 and is placed on the tray 14 via the front opening 36 of the casing 7 when the tray 14 is in the second predetermined position "B", the cartridge shutter 42 (see FIGS. 3 and 4) is opened by an engagement portion (not shown) on the tray 14. Then, the elevator drive mechanism 27 subsequently lowers the tray 14 from the second predetermined position "B" to the third predetermined position "C". During shift of the tray 14 between the second predetermined position "B" and the third predetermined position "C", the front and rear guide pins 22a and 22b are moved by the front and rear catcher links 28a and 28b along the vertically-extending portions 24a and 24b of the front and rear guide grooves. The clamp 8 presses the disc 2 in the cartridge 41 against the turntable 3 to hold the disc 2 on the turntable 3. Subsequently, the head 4 accesses the disc 2 to reproduce or write information from or on the disc 2. The opened shutter 42 allows the clamp 8 and the head 4 to access the disc in the cartridge 41. After the reproduction of information or the writing of information is completed, the elevator drive mechanism 27 lifts the tray 14 from the third predetermined position "C" to the second predetermined position "B". During shift of the tray 14 between the second predetermined position "B" and the third predetermined position "C", the front and rear guide pins 22a and 22b are moved by the front and rear catcher links 28a and 28b along the vertically-extending portions 24a and 24b of the front and rear guide grooves. In addition, the disc 2 in the cartridge 41 is released from the clamp 8. Then, the tray 14 is held in the second predetermined position (the stand-by position) "B", and the cartridge shutter 42 (see FIGS. 3 and 4) is closed. The ejection button 37 is connected to an ejecting mechanism (not shown) which can engage a disc-cartridge combination 40 on the tray 14 in the second predetermined position "B". In the case where a disc-cartridge combination 40 is on the tray 14 in the second predetermined position "B", when the ejection button 37 is actuated, the ejecting mechanism pushes forth the disc-cartridge combination 40 relative to the tray 14 and thereby ejects the disc-cartridge combination 40 from the casing 7 via the front opening 36 of the casing 40. Specifically, the disc-cartridge combination 40 is moved out of the rectangular recess 17 in the tray via the opening in the front end 18 of the tray 14 and the front opening 36 of the casing 40.

Figure 6:
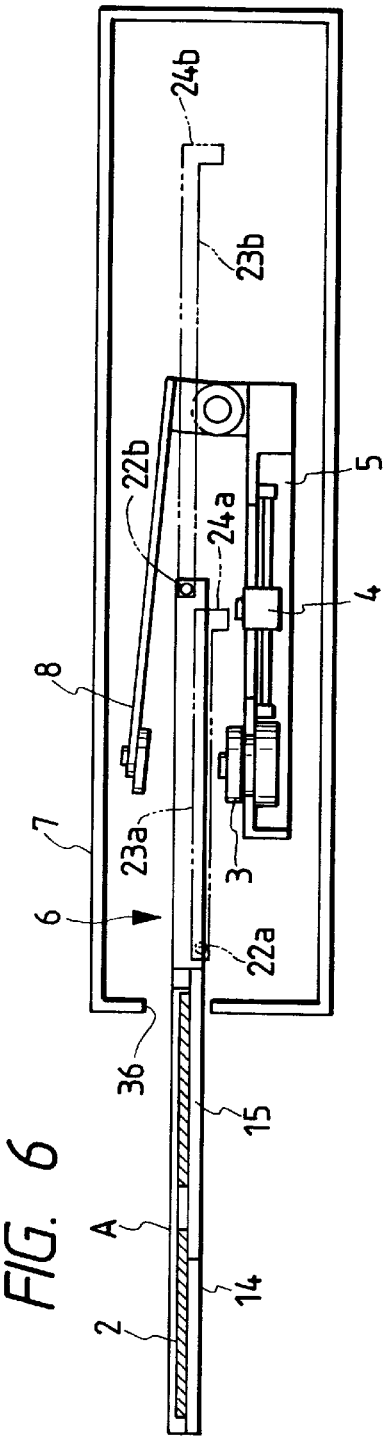
FIG. 6 is a sectional view of the disc drive apparatus in FIG. 1.
Figure 7:
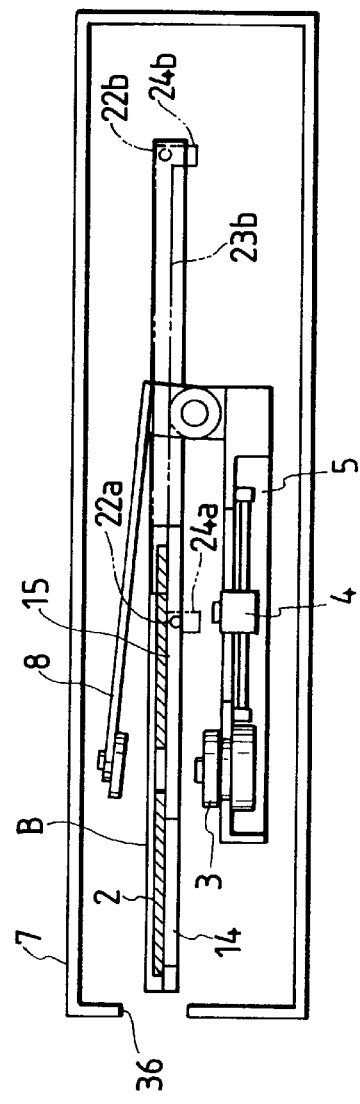
FIG. 7 is a sectional view of the disc drive apparatus in FIG. 1.
Figure 8:
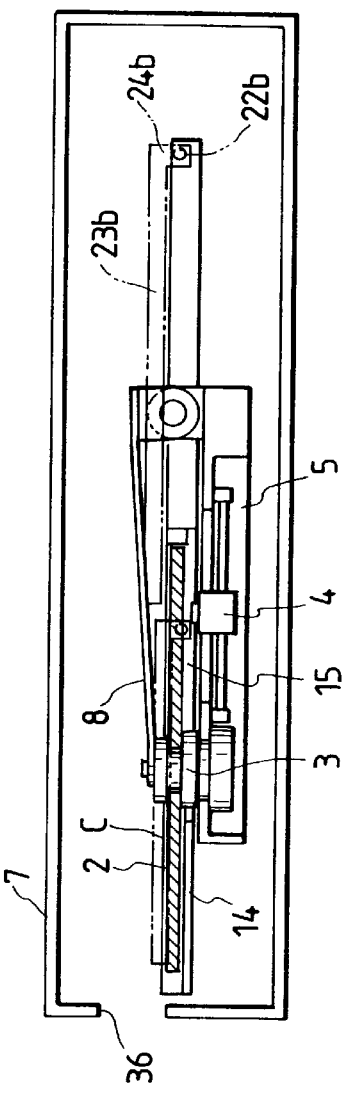
FIG. 8 is a sectional view of the disc drive apparatus in FIG. 1.

A bare disc 2 is handled by the disc drive apparatus 1 as follows. With reference to FIG. 6, a bare disc 2 is placed into the circular recess 16 in the tray 14 in the first predetermined position "A" after the tray 14 is moved out of the casing 7 to the first predetermined position "A" through the front opening 36 of the casing 7. When the tray 14 with the bare disc 2 is temporarily pushed toward the casing 7, the back-and-forth drive mechanism 25 starts to operate and then moves back the tray 14 with the bare disc 2 into the casing 7. Thus, as shown in FIG. 7, the tray 14 with the bare disc 2 reaches the second predetermined position "B". During shift of the tray 14 between the first predetermined position "A" and the second predetermined position "B", the front and rear guide pins 22a and 22b slide along the horizontally-extending portions 23a and 23b of the front and rear guide grooves. The tray 14 in the second predetermined position "B" extends above the main chassis 5. Then, the elevator drive mechanism 27 lowers the tray 14 with the bare disc 2 from the second predetermined position "B" to the third predetermined position "C". During shift of the tray 14 between the second predetermined position "B" and the third predetermined position "C", the front and rear guide pins 22a and 22b move along the vertically-extending portions 24a and 24b of the front and rear guide grooves. In addition, the clamp 8 downwardly forces the bare disc 2 into engagement with the turntable 3 as shown in FIG. 8. Thus, the clamp 8 holds the bare disc 2 on the turntable 3. In this way, the bare disc 2 assumes a normal position or a set position with respect to the main chassis 5.

While the bare disc 2 is rotated by the turntable 3, the head 4 accesses the bare disc 2 to reproduce or write information from or on the bare disc 2. After the reproduction of information or the writing of information is completed, the elevator drive mechanism 27 lifts the tray 14 with the bare disc 2 from the third predetermined position "C" to the second predetermined position "B". During shift of the tray 14 between the second predetermined position "B" and the third predetermined position "C", the front and rear guide pins 22a and 22b move along the vertically-extending portions 24a and 24b of the guide grooves. Then, the tray 14 with the bare disc 2 is held in the second predetermined position or the stand-by position "B" (see FIG. 7). When the ejection button 37 is actuated, the back-and-forth drive mechanism 25 moves forth the tray 14 with the bare disc 2 from the second predetermined position "B" to the first predetermined position "A" (see FIG. 6). During shift of the tray 14 between the first predetermined position "A" and the second predetermined position "B", the front and rear guide pins 22a and 22b slide along the horizontally-extending portions 23a and 23b of the front and rear guide grooves. When the tray 14 assumes the first predetermined position "A", the bare disc 2 can be removed from the tray 14. Also, the bare disc 2 can be replaced by another.

Figure 9:
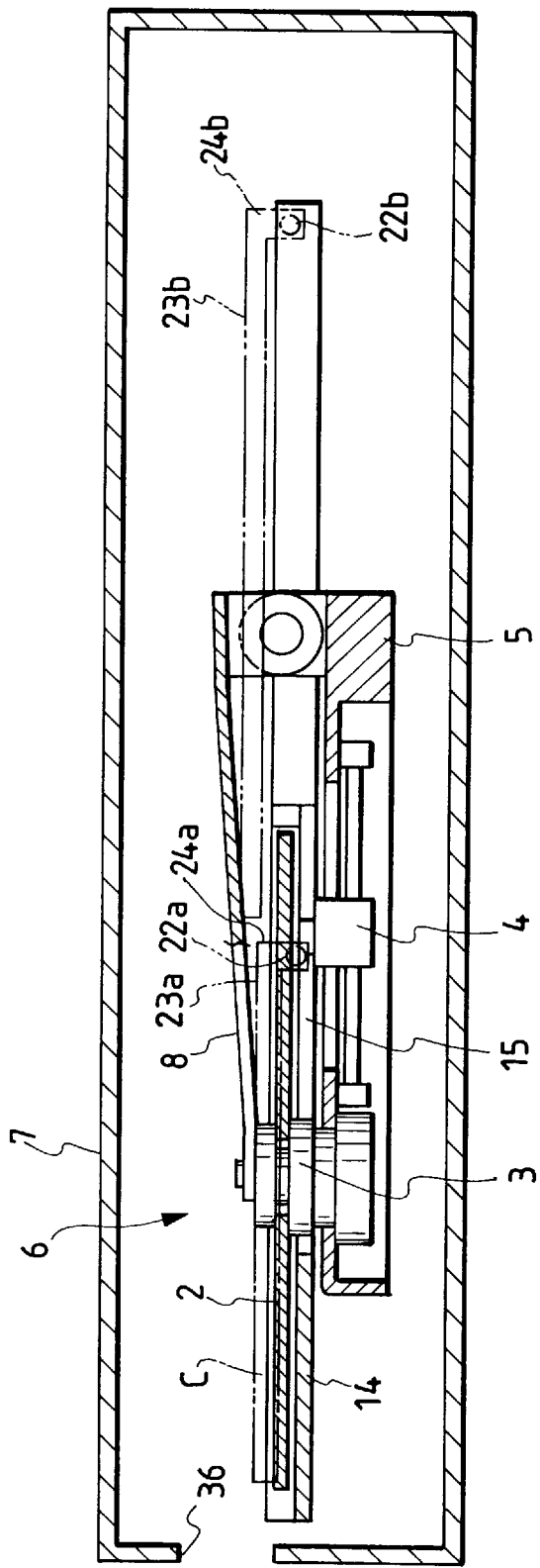
FIG. 9 is a sectional view of the disc drive apparatus in FIG. 1.

With reference to FIG. 9, the tray 14 with a bare disc 2 is lowered by the elevator drive mechanism 27 to the third predetermined position "C". In this case, the upper surface of the bottom wall of the tray 14 is moved down below a hold surface (an engagement surface) of the turntable 3. Accordingly, the bare disc 2 separates from the tray 14, being left on the hold surface of the turntable 3. The clamp 8 downwardly forces the bare disc 2 into engagement with the turntable 3, and centers the bare disc 2 with respect to the turntable 3. While the bare disc 2 is rotated by the turntable 3 while being held by the clamp 8, the head 4 accesses the bare disc 2 via the opening 15 of the tray 14. Specifically, the head 4 scans the lower side of the bare disc 2 to reproduce or write information from or on the bare disc 2.

Figure 10:
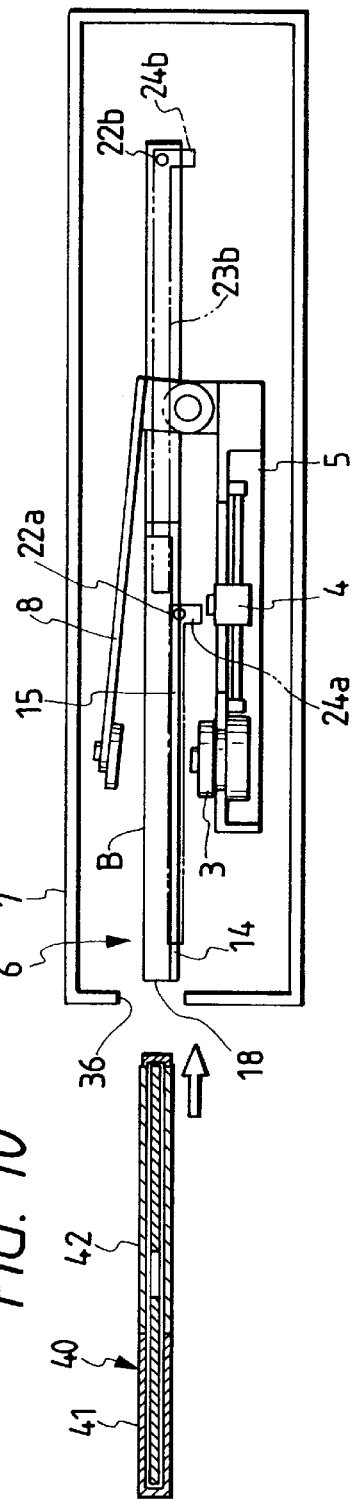
FIG. 10 is a sectional view of the disc drive apparatus in FIG. 1.
Figure 11:
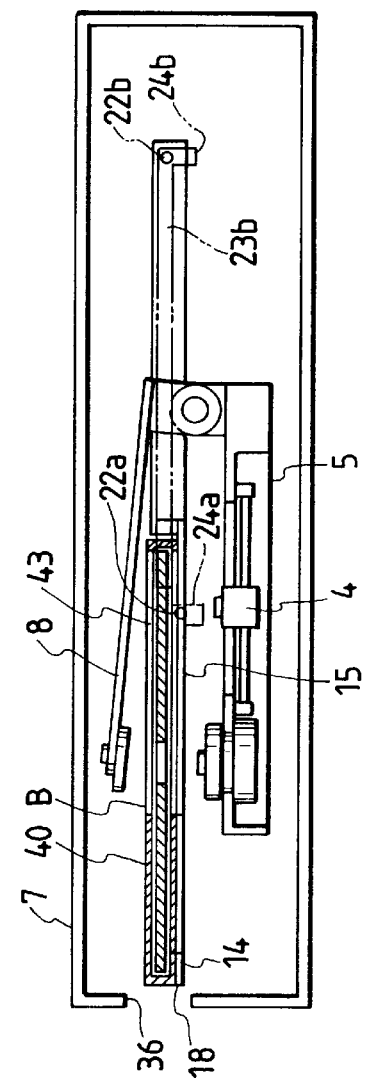
FIG. 11 is a sectional view of the disc drive apparatus in FIG. 1.
Figure 12:
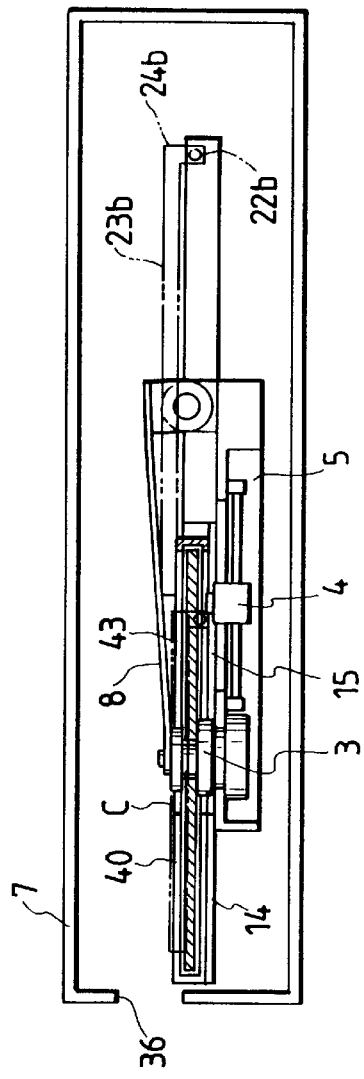
FIG. 12 is a sectional view of the disc drive apparatus in FIG. 1.

A disc-cartridge combination 40 is handled by the disc drive apparatus 1 as follows. With reference to FIG. 10, the disc loading mechanism 6 holds the tray 14 in the second predetermined position (the stand-by position) "B" above the main chassis 5. When the tray 14 is in the second predetermined position "B", the front end 18 of the tray 14 is located near and exposed via the front opening 36 of the casing 7. A disc-cartridge combination 40 is manually inserted into the casing 7 and is manually placed into the rectangular recess 17 in the tray 14 via the front opening 36 of the casing 7 and the opening in the front end 18 of the tray 14. At this time, the disc-cartridge combination 40 is guided along sides of the rectangular recess 17 in the tray 14. Thus, as shown in FIG. 11, the disc-cartridge combination 40 reliably falls into a normal position determined by the rectangular recess 17. In addition, the engagement portion (not shown) on the tray 14 opens the cartridge shutter 42. As shown in FIG. 12, the elevator drive mechanism 27 lowers the tray 14 with the disc-cartridge combination 40 from the second predetermined position "B" to the third predetermined position "C". During shift of the tray 14 between the second predetermined position "B" and the third predetermined position "C", the front and rear guide pins 22a and 22b move along the vertically-extending portions 24a and 24b of the front and rear guide grooves. It should be noted that the third predetermined position "C" agrees with the set position (the normal position) with respect to the main chassis 5. In addition, the clamp 8 downwardly forces the disc 2 of the disc-cartridge combination 40 into engagement with the turntable 3. The opened cartridge shutter 42 allows the clamp 8 to access the disc 2 of the disc-cartridge combination 40. Thus, the disc 2 of the disc-cartridge combination 40 assumes a normal position or a set position with respect to the main chassis 5.

While the disc 2 of the disc-cart ridge combination 40 is rotated by the turntable 3, the head 4 accesses the disc 2 to reproduce or write information from or on the disc 2. The opened cartridge shutter 42 allows the head 4 to access the disc 2. After the reproduction of information or the writing of information is completed, the elevator drive mechanism 27 lifts the tray 14 with the disc-cartridge combination 40 from the third predetermined position "C" to the second predetermined position "B". During shift of the tray 14 between the second predetermined position "B" and the third predetermined position "C", the front and rear guide pins 22a and 22b move along the vertically-extending portions 24a and 24b of the guide grooves. In addition, the disc 2 of the disc-cartridge combination 40 is released from the clamp 8. Then, the tray 14 with the disc-cartridge combination 40 is held in the second predetermined position "B" (see FIG. 11), and the cartridge shutter 41 is closed. When the ejection button 37 is actuated, the ejecting mechanism (not shown) pushes forth the disc-cartridge combination 40 relative to the tray 14 and thereby ejects the disc-cartridge combination 40 from the casing 7 via the front opening 36 of the casing 40. Specifically, the disc-cartridge combination 40 is moved out of the rectangular recess 17 via the opening in the front end 18 of the tray 14 and the front opening 36 of the casing 7. Accordingly, the disc-cartridge combination 40 can be replaced by another.

Figure 13:
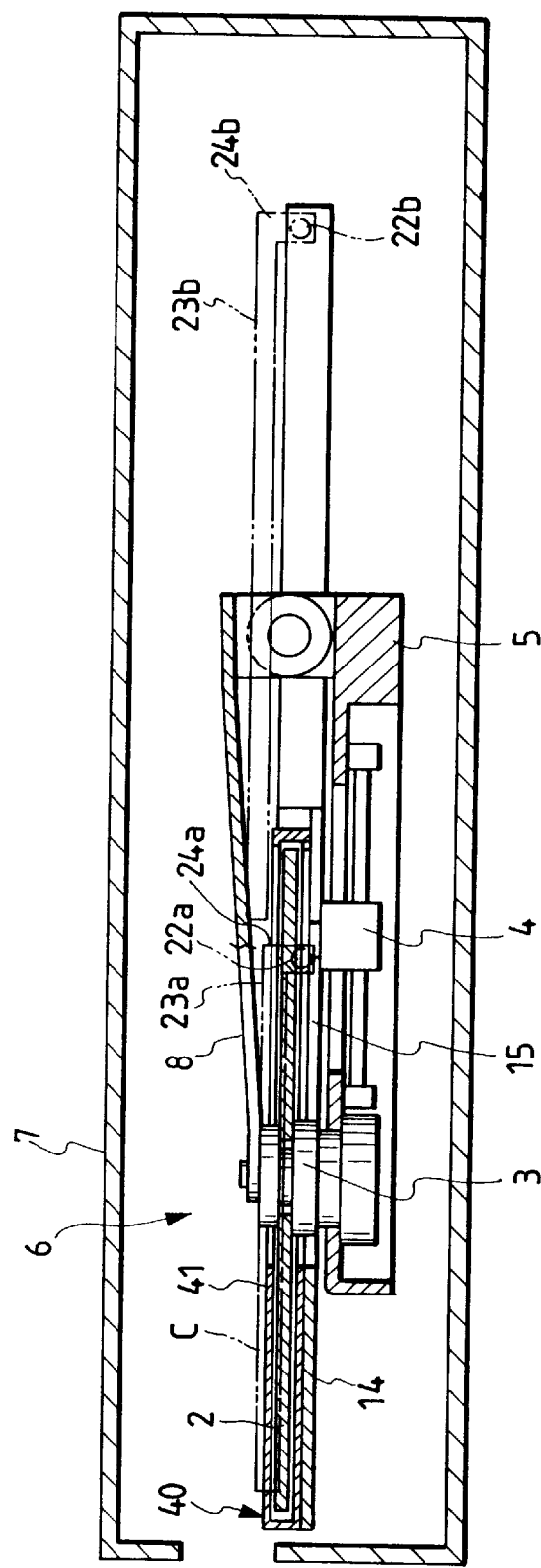
FIG. 13 is a sectional view of the disc drive apparatus in FIG. 1.

With reference to FIG. 13, the tray 14 with a disc-cartridge combination 40 is lowered by the elevator drive mechanism 27 to the third predetermined position "C". In this case, the upper surface of the bottom wall of the tray 14 is moved down below the hold surface (the engagement surface) of the turntable 3. Also, the upper surface of the bottom wall of the cartridge 41 is moved down below the hold surface (the engagement surface) of the turntable 3. Accordingly, the disc 2 of the disc-cartridge combination 40 separates from the bottom wall of the cartridge 41, being left on the hold surface of the turntable 3. The clamp 8 downwardly forces the disc 2 of the disc-cartridge combination 40 into engagement with the turntable 3, and centers the disc 2 with respect to the turntable 3. In this case, the disc 2 is separate from the inner surfaces of the cartridge 41. In other words, the disc 2 floats relative to the cartridge 41. While the disc 2 of the disc-cartridge combination 40 is rotated by the turntable 3 while being held by the clamp 8, the head 4 accesses the disc 2 via the opening 15 of the tray 14 and the lower opening 43 of the cartridge 41. Specifically, the head 4 scans the lower side of the disc 2 of the disc-cartridge combination 40 to reproduce or write information from or on the disc 2.

As understood from the previous explanation, it is unnecessary to move the tray 14 out of the casing 7 when a disc-cartridge combination 40 is placed in position within the casing 7. In this regard, the disc drive apparatus 1 is advantageous over the prior-art disc drive apparatus in Japanese application 7-161112.

What is claimed is:

1. A disc drive apparatus comprising:

a main chassis;

a turntable provided on the main chassis for rotating a disc;

a head for accessing a disc rotated by the turntable;

a disc loading mechanism including a tray for loading a bare disc or a combination of a disc and a cartridge onto the turntable; and means for moving the tray among first, second, and third predetermined positions, the first predetermined position being designed for placing a bare disc on the tray wherein said tray is thereafter moved between said first and second positions, the second predetermined position being designed for placing a combination of a disc and a cartridge on the tray from a direction of said first position, the third predetermined position being designed for holding a bare disc or a disc in a cartridge on the turntable wherein the first predetermined position is a position located external to an enclosure encasing the disc drive apparatus and the second and third predetermined positions are positions located within the enclosure of the disc drive apparatus; the tray having an end with an opening that allows insertion of the combination of a disc and a cartridge therein in the direction of tray retraction after the tray has already been fully retracted into said enclosure at said second predetermined position.

2. A disc drive apparatus as recited in claim 1, further comprising means for guiding the tray while the tray moves among the first, second, and third predetermined positions.

3. A disc drive apparatus as recited in claim 1, wherein the enclosure further comprises a casing which supports the main chassis, the first predetermined position being in front of the main chassis so that a bare disc on the tray can be handled from above.

4. A disc drive apparatus as recited in claim 3, wherein the disc loading mechanism comprises an opening in a front of the casing, and the tray with a bare disc is allowed to move to and from the first predetermined position through the opening in the front of the casing.

5. A disc drive apparatus as recited in claim 4, wherein a combination of a disc and a cartridge can be inserted into the casing and be placed on the tray in the second predetermined position via the opening in the front of the casing.

6. A disc drive apparatus as recited in claim 1, wherein the enclosure further comprises a casing which supports the main chassis, the second predetermined position being above the main chassis and being designed so that a combination of a disc and a cartridge on the tray can be handled via a front of the casing.

7. A disc drive apparatus as recited in claim 6, wherein a front of the casing has an opening via which a combination of a disc and a cartridge can be inserted into the casing and be placed on the tray in the second predetermined position.

8. A disc drive apparatus comprising:

a casing which has an opening;

a movable tray;

first means for moving the tray relative to the casing between first and second predetermined positions, the tray extending outward from the casing when assuming the first predetermined position, the tray in the first predetermined position accepting a bare disc, the tray being in the casing when assuming the second predetermined position, the tray passing through the opening in the casing when moving between the first and second predetermined positions;

second means for allowing a combination of a disc and a cartridge to be manually inserted into the casing in substantially the same direction as said first means moves said movable tray from said first to said second predetermined positions and to be manually placed on the tray via the opening in the casing when the tray is in the second predetermined position; and third means for accessing either a disc in a cartridge or a bare disc on the tray in the casing.

9. A disc drive apparatus as recited in claim 8, wherein the second means comprises an opening in an edge of the tray, and a recess in the tray, the opening in the tray communicating with the recess therein, the opening in the tray being located near and exposed via the opening in the casing when the tray is in the second predetermined position, the recess conforming in shape to a combination of a disc and a cartridge, the opening in the tray allowing a combination of a disc and a cartridge to be manually placed into the recess in the tray when the tray is in the second predetermined position.

10. A disc drive apparatus comprising:

a main chassis;

a turntable provided on the main chassis for rotating a disc;

a head for accessing a disc rotated by the turntable;

a disc loading mechanism including a tray for loading a bare disc or a combination of a disc and a cartridge onto the turntable;

means for allowing the tray to move among first, second, and third predetermined positions, the first predetermined position being designed for placing a bare disc on an upper surface of the tray, the second predetermined position being designed for placing a combination of a disc and a cartridge on the upper surface of the tray, the third predetermined position being designed for holding a bare disc or a disc in a cartridge on the turntable; and a casing which supports the main chassis, the first predetermined position being in front of the main chassis so that a bare disc on the upper surface of the tray can be handled from above, the second predetermined position being above the main chassis and being designed so that a combination of a disc and a cartridge on the upper surface of the tray can be handled via a front of the casing by moving said combination of a disc and a cartridge along a path extending from said first position to said second position onto said tray;

wherein the tray descends toward the main chassis as the tray moves from the second predetermined position to the third predetermined position; wherein the first predetermined position is a position located external to the casing and the second and third predetermined positions are positions located within the casing; the tray having an end with an opening that allows insertion of the combination of a disc and a cartridge therein in the direction of tray retraction after the tray has already been fully retracted into the casing at said second predetermined position.

11. A disc drive apparatus as recited in claim 10, further comprising means for guiding the tray while the tray moves among the first, second, and third predetermined positions.

12. A disc drive apparatus as recited in claim 10, wherein the disc loading mechanism comprises an opening in a front of the casing, and the tray with a bare disc is allowed to move to and from the first predetermined position through the opening in the front of the casing.

13. A disc drive apparatus as recited in claim 12, wherein a combination of a disc and a cartridge can be inserted into the casing and be placed on the upper surface of the tray in the second predetermined position via the opening in the front of the casing.

14. A disc drive apparatus as recited in claim 10, wherein a front of the casing has an opening via which a combination of a disc and a cartridge can be inserted into the casing and be placed on the upper surface of the tray in the second predetermined position.

\* \* \* \* \*